United States Patent
Pleace et al.

(10) Patent No.: US 8,649,903 B2
(45) Date of Patent: Feb. 11, 2014

(54) AUTOMATED SEAL INSTALLATION

(75) Inventors: Paul R Pleace, Wixom, MI (US); Craig A. Rodriguez, St. Clair Shores, MI (US); Jean-Yves Chretien, Macomb, MI (US); Robert J. Scheuerman, Washington, MI (US); Peter W. Tavora, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 278 days.

(21) Appl. No.: 13/190,713

(22) Filed: Jul. 26, 2011

(65) Prior Publication Data

US 2013/0030567 A1    Jan. 31, 2013

(51) Int. Cl.
    *B29C 61/00* (2006.01)
(52) U.S. Cl.
    USPC ............................................ 700/245; 29/446
(58) Field of Classification Search
    USPC ............... 700/245, 253, 261; 156/160, 304.1, 156/494, 495, 496, 502, 503; 29/446, 450, 29/451
    See application file for complete search history.

(56) References Cited

U.S. PATENT DOCUMENTS 5,020,278 A *   6/1991   St. Angelo et al. .......... 49/490.1
7,055,228 B2 *  6/2006   Thommes et al. .............. 29/235

* cited by examiner

*Primary Examiner* — Dalena Tran

(57) ABSTRACT

An assembly and method for automated installation of a flexible seal to a periphery of a component. The method may include positioning the periphery of the component adjacent to a seal feed assembly; employing a motor to move the seal toward the periphery of the component until a predetermined torque on the motor is reached; stopping movement of the motor when the predetermined torque is reached; moving the component relative to the seal feed assembly; and, as the component is moved relative to the seal feed assembly, automatically maintaining the predetermined torque in the motor by moving the seal toward the periphery of the component. The component may be a vehicle door to which a seal is installed.

13 Claims, 1 Drawing Sheet

AUTOMATED SEAL INSTALLATION

BACKGROUND OF INVENTION

The present invention relates generally to robotic installation of flexible seals on parts, and more particularly to robotic installation of flexible seals onto vehicle components.

Flexible seals may be applied to various components, where the seal includes a strip of adhesive that is pressed against the component as the seal is wrapped around the periphery of the component. For example, a vehicle door may have a primary seal mounted around its periphery in order to seal the periphery of the door to the vehicle body. This seal may prevent water intrusion into the vehicle and reduce wind noise as the vehicle is moving. Such seals may be made of, for example, a flexible rubber tube. Such a seal may be hand installed, but this is slow and does not guarantee accurate placement of the seal on the door.

Others have automated the process of applying a primary seal to a vehicle door by using a robot to move the door while a machine dispenses the seal onto the door. The seal in this particular case may have an adhesive along one side that is pressed against the door as the seal is dispensed onto the door. This machine feeds out the seal at a rate that attempts to match the speed of the door periphery moving past the machine as the robot moves the door. However, due to the complex shapes of door peripheries, the robots employed tend to use six motors to obtain all of the degrees of freedom needed to move the door past the machine. This complexity tends to cause speed fluctuations, especially around corners on the door periphery, where the speed of the periphery of the door moving past the machine and the rate of seal feed from the machine can be as high as twenty percent different. This unintended difference in speed causes the flexible seal to distort (either stretch or contract) as the adhesive is pressed onto the door. The flexible seal then relaxes before the adhesive has fully set, which may pull the seal away from the door at some locations. Thus, the seal is not completely attached to the door periphery, which can cause sealing issues.

SUMMARY OF INVENTION

An embodiment contemplates a method of automated installation of a flexible seal to a periphery of a component, the method comprising the steps of: positioning the periphery of the component adjacent to a seal feed assembly; employing a motor to move the seal toward the periphery of the component until a predetermined torque on the motor is reached; stopping movement of the motor when the predetermined torque is reached; moving the component relative to the seal feed assembly; and as the component is moved relative to the seal feed assembly, maintaining the predetermined torque in the motor by feeding the seal toward the periphery of the component.

An embodiment contemplates an automated seal installer for installing a seal around a periphery of a component. The installer may comprise a seal feed assembly, a robot and a controller. The seal feed assembly may include a drive mechanism having a torque motor connected to a drive belt, with the drive belt configured to move a seal through the seal feed assembly, and an application wheel configured to sandwich the seal between the application wheel and the periphery of the component. The robot lifts and moves one or the other of the component and the seal feed assembly relative to the other in a predefined path. The controller controls the movement of the robot and sets a torque for the torque motor, with the torque motor configured to stall out when the predefined torque is reached and move the drive belt when the torque is below the predefined torque.

An advantage of an embodiment is that stretch of the flexible seal is minimized during installation, thus allowing for proper setting of adhesive to hold the seal to the component. Another advantage of the invention is that the logic control for the automated installation of the seal is simplified by maintaining the particular force (torque) desired on the seal as it is dispensed from the seal feeding assembly, rather than needing to monitor motion of the door to attempt to adjust the seal feed rate to match. Maintaining the material stretch and adhesion requirements may also improve cycle time for automated installation of the seal.

DETAILED DESCRIPTION

Figure 1:
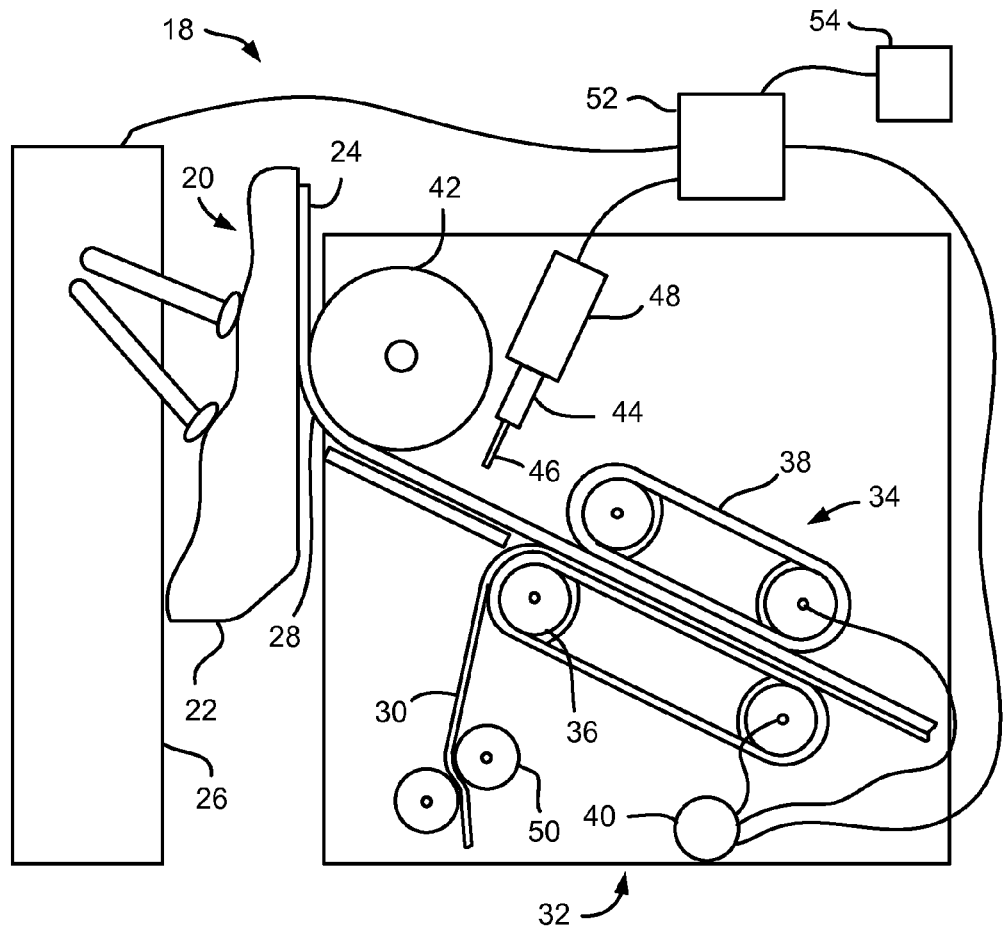
FIG. 1 is a schematic view of a flexible seal being applied to a periphery of a component, such as a vehicle door.

Referring to FIG. 1, a component, indicated generally at 20, is shown. The component 20 may be, for example, a vehicle door 20 (partially shown) having a periphery 22 around which a flexible seal 24 is adhered. The seal 24 may be, for example, a primary door seal (weather seal), that is used to seal between the door 20 and a vehicle body (not shown). The door 20 may be supported by a robot 26 that supports and moves the door through a predefined path when installing the seal 24 to the door 20. The robot 26 may be a conventional robot used for lifting and moving a component through a predefined path and so will not be discussed in more detail herein. The robot 26 is part of an automated seal installer 18.

The seal 24 is made of a flexible material such as, for example, rubber, and may be hollow, but does not have to be hollow. The seal 24 may also have a layer of adhesive 28 on one side, and include an adhesive cover 30. The adhesive cover 30 is sized and located to cover the adhesive 28 on the seal 24 and is automatically pulled off of the adhesive 28 just before the seal 24 is applied to the door 20. The seal 24 is fed through a seal feed assembly 32 as it is applied to the door 20.

The seal feed assembly 32 includes a drive mechanism 34 that includes two pair of rotating wheels 36, each pair supporting and driving drive belts 38. The seal 24 is sandwiched between the drive belts 38 and fed through the assembly 32 by the drive belts 38. The rotating wheels 36 are driven by a variable torque motor 40. The variable torque motor 40 can be set to provide a predetermined torque output, even when the speed of the rotating wheels 36 varies.

The seal feed assembly 32 may also include a seal cutter 44 and an application wheel 42. The application wheel 42 sandwiches the seal 24 between the application wheel 42 and a periphery 22 of the door 20. This wheel 42 may be a free spinning wheel, without control over its rotation. The seal cutter 44 may include a blade 46 and a blade actuator 48 that actuates the blade 46 to cut the seal 24 when the length of seal needed to cover the desired amount of the periphery of the door 20 is reached.

The seal feed assembly 32 may also include a pair of rollers 50 that pull the adhesive cover 30 off of the seal 24 and away from the door 20 while the seal 24 is being applied to the door 20.

A controller 52 communicates with the variable torque motor 40, the seal cutter 44 and the robot 26 to control the automated seal installation process. The controller may be any suitable combination of hardware and software used for controlling an automated process. A human-machine interface 54 communicates with the controller to receive inputs from a technician. This human-machine interface may include a touch screen, a mouse, a keyboard, or other typical types of interfaces that allow information to be communicated between a technician and a controller.

Figure 2:
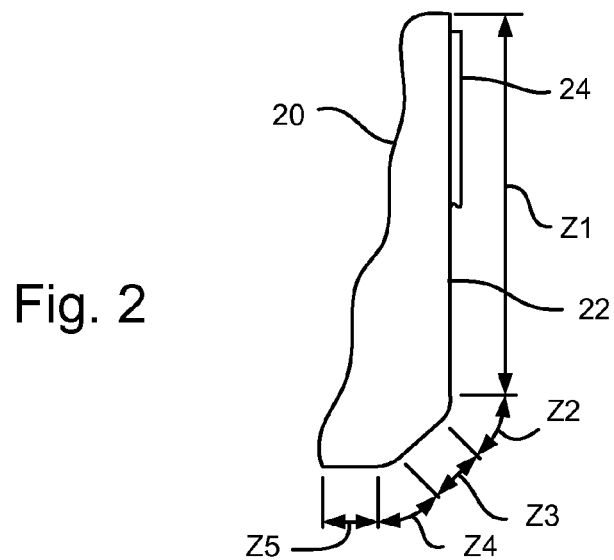
FIG. 2 is a schematic view illustrating zones around a component (door) periphery that may have different seal forces programmed for each.

FIG. 2 illustrates a portion of the door 20 of FIG. 1, with different zones (Z1 to Z5) indicated around a portion of the door periphery 22. These zones represent areas of the door periphery 22 where the controller may change the torque setting for the variable torque motor 40 as the seal 24 is being applied in each particular zone. The zones may correlate to different shape features on the door periphery 22, such as, for example, corners, straight sections, or curved sections. The torque variation may provide for minimizing any potential seal distortion during application, and hence provide for optimal adhesion of the adhesive to the door 20. For example, the torque setting may be increases when the seal 24 is being applied around a corner, as opposed to a straight segment, of the door periphery 22. Additionally, the torque setting for the motor 40 may be varied based on other factors such as, for example, overall robot speed, type and shape of the seal and the material of the seal. The controller 52 can determine the particular zone based on the position of the robot, which indicates where on the door periphery 22 the seal 24 is being applied. The number of zones may vary based on the particular component to which a seal is being provided.

The operation of the automated seal installer 18 will now be discussed. The particular component (for example, a door) and type of flexible seal (for example a weather seal) to be applied may be entered into the human-machine interface 54. The software in the controller 52 may include a table that correlates the torque in the motor 40 to the force with which the seal 24 is pressed against the component 20 for the particular type and size of seal.

The seal 24 is loaded into the seal feed assembly 32 and the robot 26 grabs and lifts the component 20 into a predetermined position where automated seal installation will begin. The torque on the motor 40 is set to provide the desired force pushing the seal 24 against the periphery 22 for the particular zone. When the torque (and hence desired force) are reached, the motor 40 stalls out (does not move any further). The force on the seal 24 is not great enough to keep the seal 24 moving when the component 20 is not moving relative to the seal 24. The seal 24 will only dispense when the force (and hence torque) drops below the preset level, which occurs when the robot 26 moves the component 20.

As the robot 26 moves the component, the force on the seal 24 and hence the torque on the motor 40 drops, which causes the motor 40 to drive the drive belts 38, and in turn, the seal 24 toward the component. The motor 40 operates to maintain the current torque setting on it, which operates to maintain an essentially constant force on the seal 24 pressing against the periphery 22. As the seal 24 is driven toward the component, the rollers 50 pull the adhesive cover 30 from the adhesive. The adhesive side of the seal 24 is pressed against the periphery 22 as the seal 24 is sandwiched between the application wheel 42 and the periphery 22. Thus, the seal 24 is fed out and secured against the periphery 22 as the component 20 is moved by the robot 26.

As the seal 24 is applied around the periphery 22, the controller 52 tracks the location on the component 20 and adjusts the torque setting for the motor 40 when the seal begins to be applied in a new zone. The process continues until the seal 24 is applied around the desired amount of the periphery 22. When the length of seal sufficient to cover the desired amount of periphery 22 is reached, the seal cutter 44 is actuated to cut the seal 24 from the remainder of the seal stock.

This method of operation does not require one to try and match the speed of the dispensing of the seal 24 to the speed of the movement of the component periphery 22. Thus, variations in motor speed of the robot's motors do not affect the installation of the seal 24, minimizing any stretching or contracting of the seal 24 as it is being installed. By avoiding stretching or contracting the seal 24, the adhesive 28 will adhere and set without relaxation of the seal 24 pulling the adhesive 28 away from the periphery 22.

As an alternative, the component 20 can be stationary, with the seal feeding assembly moved by the robot 26 around the periphery 22—the end result is essentially the same since it is the relative movement that changes the force (torque) that is being maintained.

While certain embodiments of the present invention have been described in detail, those familiar with the art to which this invention relates will recognize various alternative designs and embodiments for practicing the invention as defined by the following claims.

What is claimed is:

1. A method of automated installation of a flexible seal to a periphery of a component, the method comprising the steps of:
   (a) positioning the periphery of the component adjacent to a seal feed assembly;
   (b) employing a motor to move the seal toward the periphery of the component until a predetermined torque on the motor is reached;
   (c) stopping movement of the motor when the predetermined torque is reached;
   (d) moving the component relative to the seal feed assembly; and
   (e) as the component is moved relative to the seal feed assembly, automatically maintaining the predetermined torque in the motor by moving the seal toward the periphery of the component.

2. The method of claim 1 wherein step (b) is further defined by the torque motor driving a pair of drive belts, and the seal is mounted between the drive belts, the drive belts moving the seal toward the periphery of the component.

3. The method of claim 1 including step (f) stripping an adhesive cover from an adhesive coating extending along the seal prior to contact of the adhesive coating against the periphery of the component.

4. The method of claim 1 including step (f) sandwiching the seal between the periphery of the component and a free spinning application wheel as the seal is extended from the seal feed assembly.

5. The method of claim 1 including step (f) when a length of the seal sufficient to extend around a predetermined amount of the periphery is reached, activating a seal cutter to automatically cut the seal.

6. The method of claim 1 wherein the component is a door and the seal is a weather seal installed around the periphery of the door.

7. The method of claim 1 including:
   (f) assigning at least a first and a second zone around the periphery, based on at least a change in geometry between the first and second zones; and (g) changing the value of the predetermined torque when the seal begins to be applied in the second zone, after the seal has been applied in the first zone.

8. The method of claim 1 wherein step (d) is further defined by the seal feed assembly being stationary and a robot lifting and moving the component relative to the seal feed assembly.

9. An automated seal installer for installing a seal around a periphery of a component, the installer comprising:
   a seal feed assembly including a drive mechanism having a torque motor drivingly connected to a drive belt, the drive belt configured to move a seal through the seal feed assembly, and an application wheel configured to sandwich the seal between the application wheel and the periphery of the component;
   a robot for lifting and moving one of the component and the seal feed assembly relative to the other in a predefined path; and
   a controller configured to control the movement of the robot and configured to set a torque for the torque motor, the torque motor configured to stall out when the predefined torque is reached and move the drive belt when the torque is below the predefined torque.

10. The installer of claim 9 wherein the seal feed assembly includes the torque motor drivingly connected to a second drive belt, the second drive belt contacting the seal on an opposite side from the drive belt and configured to move the seal through the seal feed assembly.

11. The installer of claim 9 wherein the seal feed assembly includes a seal cutter, and the controller is configured to actuate the seal cutter when a predetermined length of seal is fed through the seal feed assembly.

12. The installer of claim 9 wherein the seal feed assembly includes a pair of rollers configured to pull an adhesive cover from the seal as the seal is fed through the seal feed assembly.

13. The installer of claim 9 wherein the controller is configured to detect which portion of the periphery is receiving the seal and adjust the predetermined torque setting for the torque motor based upon which portion of the periphery is receiving the seal.

* * * * *